United States Patent [19]

Hill et al.

[11] 4,104,534

[45] Aug. 1, 1978

[54] STARTER MOTOR CONTROL CIRCUIT FOR AN INTERNAL COMBUSTION ENGINE

[75] Inventors: William Frank Hill, Stafford; John Peter Southgate, Sutton Coldfield, both of England

[73] Assignee: Lucas Electrical Limited, Birmingham, England

[21] Appl. No.: 675,357

[22] Filed: Apr. 9, 1976

[30] Foreign Application Priority Data

Apr. 15, 1975 [GB] United Kingdom ............... 15360/75

[51] Int. Cl.² ......................... F02N 11/06; H02P 9/04

[52] U.S. Cl. ............................. 290/37 A; 180/105 R; 123/179 BG

[58] Field of Search ................ 290/36 R, 37 A, 38 R, 290/38 C, 36 R, 37 A, 38 R, 38 C, DIG. 4; 123/179 B, 179 BG; 180/103 R, 105 E, 82 R

[56] References Cited

U.S. PATENT DOCUMENTS 3,053,243 9/1962 Domann .......................... 123/179 B 3,443,112 5/1969 Huntzinger ....................... 290/38 R 3,715,004 2/1973 Pasek .............................. 180/103 R

*Primary Examiner*—B. Dobeck

*Assistant Examiner*—William L. Feeney

*Attorney, Agent, or Firm*—Ladas, Parry, Von Gehr, Goldsmith & Deschamps

[57] ABSTRACT

A starter motor control circuit for an engine includes an input circuit which is controlled by the ignition contact breaker of the engine, the capacitor charging each time the contact breaker opens and discharging relatively slowly when it is closed. The capacitor is connected by a complementary emitter follower transistor pair to a level detector circuit which produces an output when the voltage on the capacitor is between predetermined limits. At below a predetermined speed this output is a train of constant length pulses which control charging and discharging of a further capacitor. When the voltage on the capacitor is less than a predetermined minimum a regenerative switching circuit is operated to cut out the starter circuit. A feedback transistor maintains the capacitor discharged until the engine stops.

12 Claims, 1 Drawing Figure

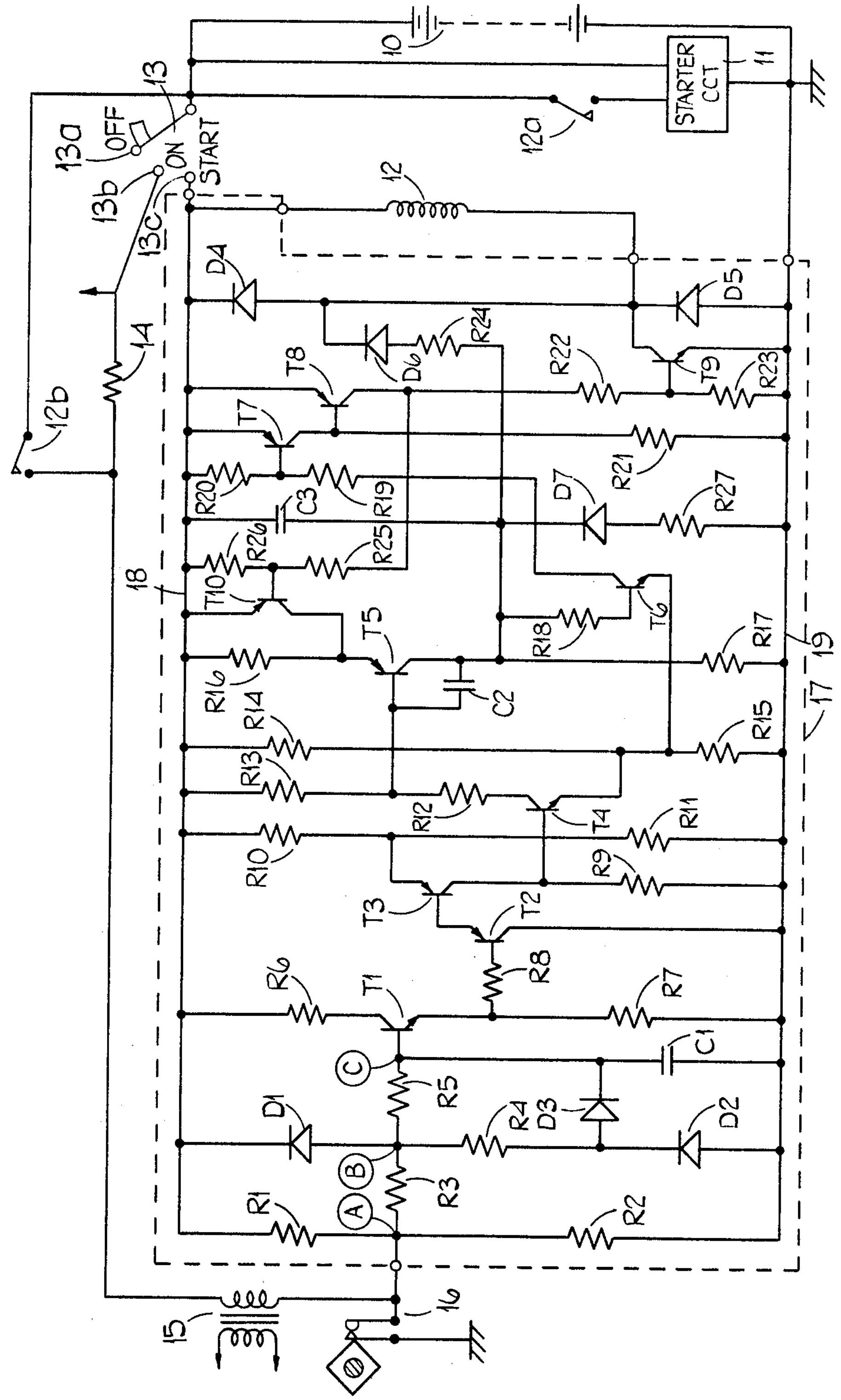
STARTER CCT
OFF
ON
START
10
11
12
12a
12b
13
13a
13b
13c
14
15
16
17
18
19
D1
D2
D3
D4
D5
D6
D7
T1
T2
T3
T4
T5
T6
T7
T8
T9
T10
R1
R2
R3
R4
R5
R6
R7
R8
R9
R10
R11
R12
R13
R14
R15
R16
R17
R18
R19
R20
R21
R22
R23
R24
R25
R26
R27
C1
C2
C3
A
B
C

STARTER MOTOR CONTROL CIRCUIT FOR AN INTERNAL COMBUSTION ENGINE

This invention relates to a starter motor control circuit for an internal combustion engine and has as an object to provide a convenient form of circuit which will prevent energisation of the starter motor when the engine is already running and cause de-energisation of the starter motor at a predetermined engine speed.

A circuit in accordance with the invention comprises means for generating a pulse train at a frequency related to the engine speed, a starter motor switching circuit and frequency sensitive means for initiating operation of said motor switching circuit to permit starter motor energisation only when the frequency is below a first predetermined level and for operating said switching circuit to discontinue starter motor energisation when the frequency rises above a higher second predetermined level.

The pulse generating means may be sensitive to pulses produced by the ignition system of the engine and includes a pulse shaping circuit such that at engine speeds below the speed corresponding to said second predetermined frequency level the pulses are of approximately constant duration.

The frequency sensitive circuit may include a capacitor having charge and discharge paths between which it is switched by the pulses from the pulse shaping circuit, the switching circuit being sensitive to the peak or minimum voltage on the capacitor.

The switching circuit preferably operates with regenerative switching action and includes a switching element which by-passes one of the paths to said capacitor.

An example of the invention is shown in the accompanying drawing which is a circuit diagram of the control circuit.

As shown in the drawing the circuit includes a battery 10 across which a starter circuit 11 is connected. The starter circuit includes its own power switch and is controlled by a relay contact 12*a* of a relay 12. The relay contact 12*a* is normally open and connects one side of the battery 10 to the starter circuit 11 which will not be described in detail herein.

The engine ignition switch 13 has an off contact 13*a*, an on contact 13*b*, and a start contact 13*c*. The switch 13 is such that in an on position only the contact 13*b* is connected to the positive pole of the battery 10 and in the start position both contacts 13*b* and 13*c* are connected to the positive pole of the battery 10. The contact 13*b* is connected to various ignition switch operated circuits of the vehicle in which the engine is used and via a resistor 14 to the primary of the ignition coil 15 of the engine. The contact breaker 16 intermittently connects the other end of the primary to earth when the engine is running. The relay 12 has a second normally open contact 12*b* which connects the primary of the ignition coil 15 directly to the positive pole of the battery, thereby shorting out the resistor 14 when closed.

The starter motor control circuit 17 has a positive supply rail 18 connected to the start contact 13*c* of the ignition switch and a negative supply rail 19 connected to the negative pole of the battery 10.

The input to the circuit 17 is taken from the coil side of the contact breaker 16 which is connected to the common point of two resistors R1, R2 connected in series between the rails 18, 19. The common point of the resistors R1, R2 is connected via a resistor R3 to the anode of a diode D1 having its cathode connected to the rail 18, the anode of the diode D1 being connected via a resistor R4 to the cathode of diode D2 which has its anode connected to the rail 19. The anode of the diode D1 is connected via a resistor R5 to the cathode of a diode D3 which has its anode connected to the cathode of the diode D2. The cathode of the diode D3 is also connected through a capacitor C1 to the rail 19.

The components thus far described operate as follows. At the point A which is the common point of resistors R1 and R2 there is impressed the wave form generated by opening and closing the contact breaker which is in series with the ignition coil 15. Whilst the contact breaker is closed the point A is at the same voltage as rail 19 but on opening of the contact breaker the voltage at A swings at high frequency between positive and negative extreme voltages outside the voltage range of the rails 18, 19. The voltage then settles at the battery voltage when all current has ceased flowing through the ignition coil and drops again to the negative rail voltage when the contact breaker re-closes. The diodes D1 and D2 effectively clip the wave form produced when the contact breaker opens so that on opening of the contact breaker the voltage at the point B which is at the anode of the diode D1, rises to the battery voltage and falls again to the negative rail voltage when the contact breaker 16 closes again. The diode D3 allows rapid charging of the capacitor C1 via the resistor R4, but the capacitor C1 can only discharge slowly through the resistors R5, R3 and the contact breaker so that the voltage at the point C which is at the cathode of the diode D3 follows the rising edge of the wave form at the point B but when the voltage at the point B drops back to the negative rail voltage the voltage at the point C decays exponentially towards zero.

The cathode of the diode D3 is connected to the base of an n-p-n transistor T1 which has its collector connected via a resistor R6 to the rail 18 and its emitter connected via a resistor R7 to the rail 19. The emitter of the transistor T1 is connected via a resistor R8 to the base of a p-n-p transistor T2 which has its collector grounded to the rail 19. The transistors T1 and T2 act as complementary emitter followers so that the voltage on the emitter of the transistor T2 is the same as that at the point C.

The emitter of transistor T2 is connected to the base of a p-n-p transistor T3 which has its collector grounded via a resistor R9 and its emitter connected to the common point of a non-negligible impedance potential divider chain constituted by two resistors R10 and R11 connected between the rails 18 and 19. The potential on the emitter of transistor T3 is set to be about 75% of the rail voltage so that the transistor T3 is saturated whenever the voltage at the point C is less than 75% of the rail voltage. The collector of the transistor T3 is connected to the base of an n-p-n transistor T4 the collector of which is connected to the rail 18 via two resistors R12 and R13 in series. The emitter of the transistor T4 is connected to the common point of a potential divider chain of low impedance consisting of two resistors R14 and R15 connected between the rails 18, 19. The resistors R14, R15 are chosen to set the emitter of transistor T4 at about 25% of the rail voltage so that transistor T4 only conducts when the voltage at the point C is between 25% and 75% of the rail voltage. During slow running conditions of the engine, therefore, the transistor T4 will produce constant length pulses of length determined by the time constant of C1, R3 and R5. There will also be very narrow spikes between successive pulses (as the capacitor C1 charges), but these will not be detected by the following circuits.

The pulse generating circuit described above supplies pulses to a switching circuit which includes a p-n-p transistor T5 having its base connected to the common point of the resistors R12 and R13 and its emitter connected to the rail 18 via a resistor R16. The collector of transistor T5 is connected to the rail 19 via a resistor R17 and the base and collector of transistor T5 are interconnected by a capacitor C2 which suppresses high frequency transients. The collector of the transistor T5 is connected to the rail 18 via capacitor C3 which, when the transistor T5 is non-conductive, can charge up to the full rail voltage via the resistor R17 of high ohmic value so that the RC circuit constituted by the resistor 17 and the capacitor C3 has a high time constant. When the transistor T4 is conductive the combination of resistors R12, R13 and R16 and transistor T5 act as a current source discharging C3, the voltage on the collector of transistor T5 rising as the capacitor C3 discharges.

The voltage on the collector of the transistor T5 is detected by a circuit including an n-p-n transistor T6 having its base connected to the collector of transistor T5 via a resistor R18 and its emitter connected to the common point of the resistors R14 and R15. The collector of transistor T6 is connected to the rail 18 via two resistors R19 and R20 in series. The common point of the resistors R19 and R20 is connected to the base of a p-n-p transistor T7 having its emitter connected to the rail 18 and its collector connected to the rail 19 via a resistor R21. The collector of the transistor T7 is connected to the base of a p-n-p transistor T8 with its emitter connected to the rail 18 and its collector connected via two resistors R22 and R23 in series to the rail 19. The common point of the resistors R22, R23 is connected to the base of an n-p-n power transistor T9 which has its emitter grounded to the rail 19 and its collector connected to one end of the relay coil 12, the other end of which is connected to the rail 18. The collector of the transistor T9 is connected to the anode of a diode D4 the cathode of which is connected to the rail 18 and to the cathode of a diode D5 the anode of which is connected to the rail 19. The diode D4 acts as a free wheel diode for the coil 12 and the diode D5 protects the transistor T9 against reverse supply transients.

The switching circuit referred to is made regenerative by two positive feed back paths. One of these consists of a diode D6 having its cathode connected to the collector of the transistor T9 and its anode connected via a resistor R24 to the collector of the transistor T5. The other feed back path consists of a p-n-p transistor T10 having its collector-emitter path shunting the resistor R16 and its base connected to the common point of two resistors R25, R26 connected in series between the collector of the transistor T8 and the rail 18.

The transistor T5 conducts whenever the transistor T4 is conducting, i.e. for the duration of the fixed length pulses passed by the transistor T4. Whilst the transistor T5 is conducting the capacitor C3 can discharge as previously mentioned. Thus the voltage on the collector of the transistor T5 will depend only on the rate at which the constant length pulses passed by the transistor T4 occur. The resistor R16 is chosen in accordance with the number of cylinders of the engine so that at a given engine speed, say 450 r.p.m. the voltage at the collector of the transistor T5 will be sufficiently above the voltage at the emitter of the transistor T4 to turn on the transistor T6. Conduction of the transistor T6 causes the transistor T7 to conduct so that the transistors T8 and T9 are turned off. The rise in voltage at the collector of transistor T9 is fed back to the base of the transistor T6 and hastens the switch off by regenerative action and also the fall in voltage at the collector of transistor T8 turns on the transistor T10 which shunts the resistor R16 thereby causing the capacitor C3 to discharge rapidly. It will be noted that whilst the transistor T9 was conductive to energise the relay 12 an additional charging path for the capacitor C3 existed through the resistor R24, the diode D6 and the transistor T9. This, in fact, shortens the charging time constant for the capacitor C3 whilst the relay 12 is energised but, when the transistor T9 is switched off the charging time constant for the capacitor C3 is determined solely by the resistor R17. The transistor T6 will, of course, become conductive whilst the transistor T5 is conductive since the voltage on the collector of transistor T5 is falling whilst the transistor T5 is non-conductive owing to charging of the capacitor C3. Thus the shunting of the resistor R16 increases the regenerative action of the switching.

The relay 12 thus opens at a predetermined engine speed and the starter circuit 11 is disabled even though the ignition switch is kept in its start position.

Once the condition referred to above has occurred the capacitor C3 will be substantially completely discharged so that if the ignition switch is moved to its start position again the transistor T6 will conduct and prevent the transistor T9 from being turned on. If the engine is switched off and an attempt is made to re-start it before the engine has stopped running the same condition will apply, i.e. the transistor T9 cannot be made to conduct. In this condition the capacitor C3 can only charge through the resistor R17 with a very long time constant compared with the discharge time constant via the transistor T10. The capacitor C3 acts as a timer, comparing the time interval between successive pulses with a predetermined time established by the time constant for charging the capacitor through the resistor R17. Each pulse applied to the base of the transistor T5 causes the capacitor C3 to discharge, thus resetting the timer, and only when the time between successive pulses is very long, for example about 1 second (which cannot possibly occur when the engine is running) can the capacitor C3 charge up sufficiently to cause the transistor T6 to be turned off allowing the transistor T9 to be turned on to energise the starter circuit. Turning on of the transistor T9 again introduces regenerative switching action via the resistor R24 but not, in this case via the transistor T10 since the transistor T5 will be non-conductive when the voltage across the capacitor C3 becomes sufficient to turn the transistor T6 off.

The circuit shown also includes a diode D7 having its anode connected via a resistor R27 to the rail 19 and its cathode connected to the collector of the transistor T5. The diode D7 and the resistor R27 serve to discharge the capacitor C3 when the switch 13 is opened so that whenever the start position of the ignition switch is selected the capacitor C3 always starts in a discharged condition and there will thus be a delay whilst the capacitor C3 charges before the relay 12 can operate.

The circuit described is also useful in conjunction with an electronic ignition system with or without a contact breaker. Such electronic ignition systems frequently include an oscillator which may produce a relatively high frequency pulse train which would be imposed on the input terminal of the circuit 17 whenever the engine was at rest in certain positions, with the ignition switch closed. The circuit described responds only to low pulse repetition frequencies and a high frequency pulse train applied at the point A would cause a continuous d.c. signal to appear at the point C at a level such that the transistor T3 would be continously turned off as would the transistor T4 so that the transistor T5 is also turned off and the capacitor C3 can charge up normally through the resistor R17 until the transistor T6 turns off allowing the transistor T9 to turn on as before.

The relay coil 12 is, it will be noted, connected between two points on the circuit 17 rather than being connected at one end directly to the start contact of the switch 13*c*. This ensures that the relay 12 cannot be energised via the diode D4 and the resistors R10, R11, R14 and R15 should the connection between the circuit 17 and the start contact 13*c* be broken. It will also be noted that the relay 12 cannot be energised if the connection between the contact breaker 16 and the input terminal circuit 17 is broken. In these conditions the point A will be at mid-rail voltage so that transistors T3 and T4 will conduct continuously causing the capacitor C3 to remain discharged via the transistors T5 and T10 which will also be constantly conducting. This prevents transistor T6 from being turned off so that transistor T9 cannot be turned on.

The contact breaker may be any mechanical or electronic means for switching coil current.

The circuit described can also be used for diesel engines where the contact breaker 16 would simply be a switch connecting point A to earth and supply voltage alternately.

I claim:

1. A starter motor control circuit for an internal combustion engine comprising pulse generating means driven by the engine for producing a pulse train at a frequency related to the engine speed, a starter motor switching circuit switchable between a first state in which starter motor operation is permitted and a second state in which such operation is inhibited, frequency sensitive means connecting the pulse generating means to the starter motor switching circuit and operating to switch said circuit to its first or second state according to the frequency of the pulse train, means responsive to the state of the starter motor switching circuit for changing the mode of operation of the frequency sensitive means, the frequency sensitive means acting as a frequency voltage converter when the starter motor switching circuit is in its first state and operating to switch the starter motor switching circuit to its second state when the frequency of the pulse train exceeds its predetermined value, and operating as a pulse resettable timer circuit which is reset by each pulse of said pulse train when the starter motor switching circuit is in its second state and acts until the expiry of the timer circuit output duration, i.e. until no pulses of said pulse train have occurred during the period exceeding the timer circuit output duration, to prevent the starter motor switching circuit from reverting to its first state.

2. A control circuit as claimed in claim 1, in which said frequency sensitive circuit includes a timing capacitor and charge and discharge paths for said timing capacitor, the pulse generating means effecting selection of one of said paths for the duration of each pulse of said pulse train and the other of said paths between such pulses so that the capacitor alternately charges and discharges, said mode selection means varying the time constant of at least one of said paths.

3. A control circuit as claimed in claim 2, in which said mode selection means operates to decrease the time constant in the charging path when the starter motor switching circuit is in its first state.

4. A control circuit as claimed in claim 3, in which said mode selection means includes a diode and a resistor in series between said capacitor and a point in said starter motor switching circuit such that said resistor is included in the charging path when the voltage at said point is such as to forward bias the diode.

5. A control circuit as claimed in claim 2, in which the mode selection means decreases the time constant of the discharge path when the starter motor switching circuit is in its second state.

6. A control circuit as claimed in claim 5, in which the mode selection means includes a transistor having its collector-emitter path connected across a resistor in said discharge path and its base connected to a point in the starter motor switching circuit such that said transistor is switched on when the starter motor switching circuit is in its second state.

7. A control circuit as claimed in claim 1, in which the pulse generating means includes a pulse-shaping circuit such that a frequencies below said predetermined level the pulses of said pulse train are of approximately constant duration.

8. A control circuit as claimed in claim 7, in which the pulse-shaping circuit includes a shaping capacitor, means driven by the engine for periodically charging said shaping capacitor, means controlling discharge of said shaping capacitor and means connected to the shaping capacitor and sensitive to the voltage thereon for producing said pulses.

9. A control circuit as claimed in claim 8, in which said means connected to the shaping capacitor comprises a level detecting circuit which produces an output whenever the voltage on the shaping capacitor is between predetermined levels.

10. A control circuit as claimed in claim 9, in which said level detecting circuit comprises a pnp transistor having its base connected via an emitter follower transistor to the shaping capacitor, and its emitter connected to a point in a resistor chain connected between a supply terminal and an earth terminal, and an npn transistor having its base connected to the collector of the pnp transistor and its emitter connected to a point on a further resistor chain connected between the supply terminal and the earth terminal, the output of the level detecting circuit being taken from the collector of the npn transistor.

11. A control circuit as claimed in claim 8, in which the engine driven means comprises a switch operated by the engine and connected to the shaping capacitor by a diode and a resistor in parallel, the shaping capacitor charging via the diode and discharging via the resistor.

12. A control circuit as claimed in claim 11, in which the switch also controls an inductive load, such as the engine spark ignition system coil, the charging path for the shaping capacitor including a further resistor connected between the switch and said resistor and there also being provided a pair of diodes connecting the junction of the further resistor and the first mentioned resistor to the supply and earth terminals of the circuit so as to clip spikes generated by the inductive load on operation of the switch.

* * * * *